United States Patent [19]

Carbary et al.

[11] Patent Number: 5,565,541
[45] Date of Patent: Oct. 15, 1996

[54] METHOD OF REDUCING THE BUBBLE FORMATION WHEN CURING A ROOM TEMPERATURE VULCANIZABLE SILICONE SEALANT COMPOSITION WITH SILICON-BONDED ALKOXY CROSSLINKER ON A HOT POROUS SURFACE

[75] Inventors: Lawrence D. Carbary, Midland; Jerome M. Klosowski, Bay City, both of Mich.

[73] Assignee: Dow Corning Corporation, Midland, Mich.

[21] Appl. No.: 464,180

[22] Filed: Jun. 5, 1995

Related U.S. Application Data

[62] Division of Ser. No. 269,592, Jul. 1, 1994, Pat. No. 5,492,728.

[51] Int. Cl.$^6$ ..................................................... C08G 77/08
[52] U.S. Cl. ................... 528/17; 528/18; 528/34; 528/901
[58] Field of Search ............................... 528/17, 18, 901, 528/34

[56] References Cited

U.S. PATENT DOCUMENTS

| | | | |
|---|---|---|---|
| 3,151,099 | 9/1964 | Cryzeriat et al. | 260/46.5 |
| 3,161,614 | 12/1964 | Brown et al. | 260/46.5 |
| 3,184,427 | 5/1965 | Russell et al. | 260/37 |
| 3,189,576 | 6/1965 | Sweet | 260/46.5 |
| 3,334,067 | 8/1967 | Weyenberg | 260/46.5 |
| 3,398,112 | 8/1968 | Johnson et al. | 260/37 |
| 5,026,812 | 6/1991 | Geilich | 528/17 |
| 5,246,995 | 9/1993 | Murakami et al. | 528/18 |

*Primary Examiner*—Melvyn I. Marquis
*Attorney, Agent, or Firm*—Roger H. Borrousch

[57] ABSTRACT

Bubble formation observed when curing a sealant composition on a hot porous substrate is reduced where the room temperature vulcanizable silicone sealant composition comprises a polydiorganosiloxane, a crosslinker with silicon-bonded alkoxy groups, filler, and a titanium catalyst by the addition of 0.5 to 2 weight percent of an oximosilicon compound.

5 Claims, No Drawings

METHOD OF REDUCING THE BUBBLE FORMATION WHEN CURING A ROOM TEMPERATURE VULCANIZABLE SILICONE SEALANT COMPOSITION WITH SILICON-BONDED ALKOXY CROSSLINKER ON A HOT POROUS SURFACE

This is a divisional of application Ser. No. 08/269,592 filed on Jul. 1, 1994, now U.S. Pat. No. 5,492,728.

BACKGROUND OF THE INVENTION

1. Field of the Invention

This invention relates to a method of bonding a room temperature vulcanizable silicone ;sealant to a porous substrate.

2. Background Information

The use of silicone sealants to bond to porous substrates such as concrete, marble, brick, and stone is a problem for the construction industry. The use of a neutral silicone sealant for such purposes is highly desirable because such sealants have little or no deleterious effects on the porous substrates against which they are cured. However, when such sealants are used, especially those which contain silicon-bonded alkoxy and titanate curing catalyst, bubbles form in the sealant during the curing process when the substrate is hot, such as when the sun heats the building materials to temperatures exceeding 40° C. Such bubbles are unacceptable and can increase the volume of the cured product by as much as two or three times compared to the cured product not cured on a hot porous substrate. The reason these bubbles form during cure of this kind of sealant composition on surfaces of hot porous substrates has not been specifically determined, but it is believed that substrates react with the curing sealant composition releasing alcohols which vaporize and which are trapped by the rapidly curing sealant composition to produce the bubbles. The inventors realize that there may be other explanations for the bubble phenomenon and do not wish to be held to this specific theory. The following solution to this bubbling problem is the object of the present invention.

SUMMARY OF THE INVENTION

This invention relates to a method of bonding silicone sealant to a hot porous substrate comprising (I) adding from 0.5 to 2 inclusive weight percent based on the total weight of a room temperature vulcanizable silicone sealant composition of an oximosilicon compound which is an oximosilane or a mixture of oximosilanes and which has a general formula $R_xSi(Ox)_y(OR')_z$ in which R is methyl, ethyl, vinyl, or phenyl, R' is methyl or ethyl, Ox is ethylmethylketoximo, x has an average value of from 0 to 2 inclusive, y has an average value of from 2 to 4 inclusive, z has an average value, of from 0 to 2 inclusive, the sum of x, y, and z is 4, and the mixture of oximosilanes have at least 80% of the silane molecules with 2 or more ethylmethylketoximo groups per molecule, to a prepared room temperature vulcanizable silicone sealant comprising a polydiorganosiloxane having condensable endgroups, a crosslinker having at least three silicon-bonded alkoxy groups per molecule, a filler, and a titanium catalyst for promoting room temperature cure of the silicone sealant composition, (II) contacting a surface of a hot porous substrate with the product obtained from (I), (III) exposing the product of (II) to atmospheric conditions allowing the product of (I) to cure to a silicone sealant, thereby obtaining a silicone sealant bonded to a surface of the hot porous substrate.

This invention also relates to another embodiment, a hot porous surface vulcanizable silicone sealant composition consisting essentially of a product obtained by adding to a prepared room temperature vulcanizable silicone sealant comprising a polydiorganosiloxane having condensable endgroups, a crosslinker having per molecule at least three silicon-bonded alkoxy groups having 1 to 2 carbon atoms per alkoxy group, a filler, and a titanium catalyst for promoting room temperature cure of the silicone sealant composition, from 0.5 to 2 inclusive weight percent based on the total weight of the silicone sealant composition of an oximosilicon compound which is an oximosilane or a mixture of oximosilanes and which has a general formula $R_xSi(Ox)_y(OR')_z$ in which R is methyl, ethyl, vinyl, or phenyl, R' is methyl or ethyl, Ox is ethylmethylketoximo, x has an average value of from 0 to 2 inclusive, y has an average value of from 2 to 4 inclusive, z has an average value of from 0 to 2 inclusive, the sum of x, y, and z is 4, and the mixture of oximosilanes have at least 80% of the silane molecules with 2 or more ethylmethylketoximo groups per molecule.

DETAILED DESCRIPTION OF THE PREFERRED EMBODIMENTS§

The method of this invention comprises modifying a room temperature vulcanizable (hereinafter referred to as RTV) silicone sealant composition by admixing 0.5 to 2 weight percent based on the total weight of the silicone sealant composition of an oximosilicon compound with it, bringing the resulting product into contact with a hot surface of a porous substrate, preferably at a temperature of at least 40° C., and then exposing the substrate and sealant composition combination to atmospheric moisture thereby obtaining a silicone sealant bonded to a hot porous substrate. This method which uses the oximosilicon compound results in a silicone sealant bonded to a hot porous substrate which has a reduced number of bubbles compared to an equivalent silicone sealant without the addition of the oximosilicon compound. In addition to the reduction in the number of bubbles formed, the bubbles, which do form, are smaller in size.

This method uses as the oximosilicon compounds in amounts of from 0.5 to 2 weight percent based on the total weight of the RTV silicone sealant composition. The amounts of 0.5 to 2 weight percent of these silanes provides the required reduction in bubble formation and do not significantly change the curing properties, the cured properties of the silicone sealant, or effect the bond between the cured silicone sealant and the hot porous substrate. The oximosilicon compound may be added as mixtures with solvents. Some of the oximosilicon compounds are more readily handled when some organic solvents are present such as toluene and hexane.

The oximosilicon compounds useful in the method of this invention are oximosilanes or mixtures of oximosilanes, are those which contain at least two ethylmethyl-ketoximo groups per molecule, and are selected from those defined by a general formula $$R_xSi(Ox)_y(OR')_z \tag{A}$$

in which R is methyl, ethyl, vinyl, or phenyl; R' is methyl or ethyl, x has a value of from 0 to 2 inclusive; y has an average value of from 2 to 4 inclusive, z has an average value of from 0 to 2 inclusive and the sum of: x, y, and z is 4. Examples of the oximosilanes of formula (A) are methyltri(ethylmethylketoximo)silane, ethyltri(ethylmethylketoximo)silane, tetra(ethylmethylketoximo)silane, vinyltri(ethylmethylketoximo)silane, phenyltri(ethylmethylketoximo)silane, methyldi(ethylmethylketoximo)methoxysilane, monomethoxytri(ethylmethylketoximo) silane, dimethoxydi(ethylmethylketoximo)silane, methyldi(ethylmethylketoximo)ethoxysilane, monoethoxytri(ethylmethylketoximo)silane, diethoxydi(ethylmethylketoximo)silane, and various mixtures of oximosilanes in which at least 80% of the silane molecules have at least two ethylmethylketoximo groups per molecule. Preferred mixtures of oximosilanes are those in which x is 1, R is methyl, R' is methyl, y is less than 3, z is greater than 0.1, and the sum of x, y, z is 4. In the mixtures of oximosilanes, other silanes can be present as long as the combined mixture is within the description of the general formula (A). Examples of such silanes are methylmono(ethylmethylketoximo)dimethoxysilane, trimethoxymono(ethylmethylketoximo)silane, ethylmono(ethylmethylketoximo)dimethoxysilane, methylmono(ethylmethylketoximo)diethoxysilane, triethoxymono(ethylmethylketoximo) silane, ethylmono(ethylmethylketoximo)diethoxysilane, and the like can be present. The preferred oximosilanes are methyltri(ethylmethylketoximo)silane and tetra(ethylmethylketoximo)silane.

The oximosilicon compound is mixed with prepared RTV silicone sealant compositions which comprise a polydiorganosiloxane with condensable endgroups, a crosslinker having at least three silicon-bonded alkoxy groups having 1 to 2 carbon atoms per group, a filler, and a titanium catalyst for promoting room temperature cure of the silicone sealant composition. These RTV silicone sealant compositions are well known in the art and are illustrated by Ceyzeriat et al in U.S. Pat. No. 3,151,099, by Brown et al in U.S. Pat. No. 3,161,614, and by Weyenberg in U.S. Pat. No. 3,334,067, all of which are hereby incorporated by reference to show RTV silicone sealant compositions and methods of their preparation.

The polydiorganosiloxanes with condensable end groups are exemplified by the disclosures of Ceyzeriat et al, Brown et al, and Weyenberg, and can be illustrated by the formulae

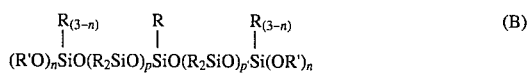

and

In the above formulae, R is methyl or ethyl; R' is methyl, ethyl, vinyl, or phenyl; R is 2 or 3, combined p plus p' has an average value of from 150 to 1100, r has an average value of from 1.99 to inclusive, g has an average value of from 1 to 1.01 inclusive, the sum of r+g is 3, and m has an average value of from 150 to 1100. As illustrated, condensable end groups means silicon-bonded hydroxyl groups or silicon-bonded alkoxy groups, specifically methoxy and ethoxy. The preferred polydiorganosiloxanes are the polydimethylsiloxanes, and especially those with viscosities at 25° C. of from 1 Pa.s to 50 Pa.s.

The crosslinkers of the RTV silicone sealant composition are alkoxysilanes which have at least three alkoxy groups per molecule wherein the alkoxy groups are either methoxy or ethoxy. These alkoxysilanes preferably contain three or four alkoxy groups per molecule, and are illustrate by methyltrimethoxysilane, methyltriethoxysilane, vinyltrimethoxysilane, vinyltriethoxysilane, ethyltrimethoxysilane, ethyltriethoxysilane, phenyltrimethoxysilane, phenyltriethoxysilane, tetramethoxysilane, tetraethoxysilane, mixtures of these alkoxysilanes and their partial hydrolyzates. Preferably, the alkoxysilanes are methyltrimethoxysilane or mixtures wherein methyltrimethoxysilane comprises a majority of the alkoxysilanes in the mixture. The amount of alkoxysilane crosslinker is preferably from 1 to 10 weight percent based on the total weight of the RTV silicone sealant composition, more preferred from 3 to 8 weight percent.

The RTV silicone sealant compositions which are mixed with the oximosilicon compound to reduce the bubbling when cured on hot porous substrate surfaces, also comprise a filler which is selected from those known to be useful in RTV silicone sealants. These fillers include calcium carbonate both ground and colloidal, calcium carbonates which are treated with stearate, crushed quartz, ground quartz, alumina, aluminum hydroxide, titanium dioxide, diatomaceous earth, reinforcing silicas such as fumed silica, precipitated silica, and hydrophobed reinforcing silicas, iron oxide, carbon black, graphite, and the like. The amount of filler is preferably from 5 to 50 weight percent based on the total weight of the RTV silicone sealant composition.

The titanium catalyst for promoting the curing of the RTV silicone sealant compositions used in this invention can be those illustrated in Ceyzeriat et al, Brown et al, and Weyenberg. The titanium catalyst can be tetraalkoxytitanates, or chelated titanium compounds. Examples of the titanium catalysts include tetraethyl titanate, tetraisopropyl titanate, tetra-n-propyl titanate, tetrabutyl titanate, bis-acetyl-acetonyldiisopropyl titanate, 2,5-diisopropyl-bis-ethylaceto-acetate titanium, and 1,3-dioxypropane-titanium-bis(ethylaceto-acetate) where the latter is described by Beers et al in U.S. Pat. No. 4,722,967, which is hereby incorporated by reference to show chelated titanates. The amount of titanium catalyst is a catalytic amount for curing the RTV silicone sealant composition, and is preferably from 0.1.to 5 weight percent based on the total weight of the RTV silicone sealant composition.

Other ingredients which are conventionally used in RTV silicone sealant compositions such as adhesion promoters, LO fungicides, colorants, pigments, plasticitizers, silane chain extenders such as dialkyldialkoxysilanes, and the like can be added as long as they do not interfere by enhancing the production of bubbles, by deteriorating the curing properties, by deteriorating the cured physical properties, or reducing the effective bonding between the cured sealant and the hot porous substrate.

The oximosilicon compound is added to a previously prepared RTV silicone sealant composition which can be one which is just made or one that is obtained commercially. The oximosilicon compound is preferably admixed with the RTV silicone sealant composition after it has been deaired or devolatilized, because this allows lower amounts of oximosilicon compound to be used. The mixing procedure should be done under conditions which exclude exposure of the materials to atmospheric moisture, especially if the resulting modified RTV silicone sealant composition is to be packaged and stored for either shipment or later use.

The modified RTV silicone sealant composition is prepared for the purpose of bonding it to the surfaces of hot porous substrates, such as stone, marble, brick, concrete, cement, and other cementitious substrates. The modified RTV silicone sealant composition can be used to bond combinations of the hot porous surfaces, as well as with other conventional building materials, such as glass and aluminum. The modified RTV silicone sealant composition is brought into contact with the hot porous surface by conventional means such as by extrusion, coating, injection, knifing, rolling, and the like. The surface of the porous substrate is preferably at a temperature of at least 40° C. Porous surfaces which are at a temperature lower than 40° C., may form some bubbles, but the reduction of bubbles is significant at temperatures of 40° C. or above, when the method of this invention is used. After the modified RTV silicone sealant composition is applied to the hot porous substrate, it is exposed to atmospheric moisture causing it to cure to a silicone sealant bonded to the hot porous substrate surface wherein there is a reduction in the number and size of bubbles in the cured silicone sealant compared to a similar RTV silicone sealant without the use of the oximosilicon compound. The undesirable bubbles are observed to form primarily at the interface between the hot porous substrate and the cured silicone surface. The modified room temperature vulcanizable silicone sealant compositions have increased working time compared to those sealant compositions which do not contain the oximosilicon compound. Another advantage of the compositions of this invention is that the modulus of the cured product is not increased by the use of the oximosilicon compound.

This invention is further illustrated by the following example which is presented for that purpose and is not intended to limit the scope of the invention which is properly delineated by the claims. In the example, "part" or "parts" refer to part by weight or parts by weight, viscosities were measured at 25° C.

EXAMPLE

A room temperature vulcanizable silicone sealant composition was prepared by mixing in the substantial absence of atmospheric moisture, 100 parts of hydroxyl terminated polydimethylsiloxane having a viscosity of about 12.5 Pa.s, 32 parts of fumed silica filler having a surface treatment of trimethylsilyl groups, 9.7 parts of methyltrimethoxysilane, and 0.7 part of tetrabutyltitanate. This silicone sealant composition was used as the control and is designated Composition A. Composition A was allowed to sit for 2.5 hours, was then deaired by centrifuging, and stored in a container which prevented the ingress of atmospheric moisture. When ready for testing, Composition A was mixed for 5 minutes in a Semkit Mixer and then spread on a concrete substrate which was heated to 50° C. in a 25.4 mm square at a thickness of about 3.2 mm. After 10 minutes, the interface between cured silicone sealant and the concrete was examined and found to contain a large number of large bubbles which measured about 6.4 mm to about 9.5 mm in diameter. The cured sealant was clear and the bubble formation was observed through the cured test pieces.

A modified room temperature vulcanizing silicone sealant composition was prepared by mixing for 5 minutes in a Semkit mixer, 134 parts of Composition A and 1.34 parts of an oximosilane mixture which was 72 weight percent methyltri(ethylmethylketoximo)silane, 21 weight percent methylmonomethoxydi(ethylmethylketoximo)silane, 0.5 weight percent methyldimethoxymono(ethylmethylketoximo)silane, and 7 weight percent impurities from the manufacture of the silane mixture. The resulting composition is designated Composition B. When ready for testing, Composition B was mixed in a Semkit mixer for 5 minutes and then spread on a concrete surface which was at 50° C. in a 25.4 mm square at a thickness of about 3.2 mm. After 10 minutes, the interface between the cured silicone sealant and the concrete was examined and found to contain bubbles in an amount of 10 fold less than those observed testing Composition A in the same way. Those bubbles which were observed were smaller in size having diameters between about 0.8 mm and 3.2 mm. This demonstrated the effectiveness of a small amount of oximosilane for reducing bubble formation in a room temperature vulcanizable silicone sealant wherein the amount of the oximosilanes were about 0.9 weight percent based on the total weight of the silicone sealant composition.

Another modified room temperature vulcanizable silicone sealant composition was prepared and tested in the same manner as Composition B, except 142.4 parts of Composition A was admixed with 2.88 parts of an oximosilane mixture which was 40 weight percent tetra(ethylmethylketoximo)silane, 49 weight percent toluene, 6.7 weight percent hexane, and 4.5 weight percent impurities from the manufacture of the silane. The resulting composition is designated Composition C. The number of bubbles at the interface between the cured silicone sealant and the hot concrete were just slightly more numerous than found for Composition B and were also slightly larger in size. This demonstrates that tetra-functional oximosilanes are effective in reducing the number and size of bubbles formed when a room temperature vulcanizable silicone composition which contains silicon-bonded alkoxy groups on the crosslinker and the catalyst is a titanium catalyst is cured on a hot porous substrate.

Each of the above compositions were cured into test pieces for the determination of physical properties. The composition test pieces were allowed to cure by exposure to atmospheric conditions at room temperature for seven days and then the durometer on the Shore A scale was determined by ASTM Standard D-2240 and the tensile strength at break, the elongation at break, the modulus at 50% elongation, at 100% elongation, and at 150% elongation were determined by ASTM Standard D-412. In addition to the physical properties after the room temperature exposure, test pieces were also heat aged for one week at 50° C. and then the same physical properties were measured. The physical property results were as shown in the following Table.

TABLE

| EXPOSURE | PHYSICAL | COMPOSITION | | |
|---|---|---|---|---|
| TIME | PROPERTY | A | B | C |
| 7 Days Room Temp. initial | Durometer, Shore A | 46 | 48 | 45 |
| | Tensile at break, MPa | 7.97 | 8.23 | 8.07 |
| | Elongation at break, % | 646 | 608 | 626 |
| | Modulus, 50%, MPa | 0.71 | 0.80 | 0.79 |
| | Modulus, 100%, MPa | 1.18 | 1.37 | 1.34 |
| | Modulus, 150%, MPa | 1.73 | 1.99 | 1.94 |
| 7 Days Room Temp. after 1 week aging at 50° C. | Durometer, Shore A | 44 | 47 | 47 |
| | Tensile at break, MPa | 6.59 | 6.98 | 6.02 |
| | Elongation at break, % | 619 | 571 | 489 |
| | Modulus, 50%, MPa | 0.65 | 0.75 | 0.78 |
| | Modulus, 100%, MPa | 1.10 | 1.30 | 1.34 |
| | Modulus, 150%, MPa | 1.60 | 1.90 | 1.94 |

The Table shows that the addition of the oximosilanes do not significantly change the physical properties of the silicone sealant either at room temperature or after heat aging at 50° C. The Table also shows that the silicone sealants are substantially equivalent and have useful properties.

That which is claimed is:

1. A room temperature vulcanizable silicone sealant composition vulcanizable on a hot porous surface with reduction in bubble formation consisting essentially of a product obtained by adding to a prepared room temperature vulcanizable silicone sealant comprising a polydiorganosiloxane having silicon-bonded methoxy or ethoxy endgroups, a crosslinker having per molecule at least three silicon-bonded alkoxy groups having 1 to 2 carbon atoms per alkoxy group, a filler, and a titanium catalyst for promoting room temperature cure of the silicone sealant composition, and from 0.5 to 2 weight percent inclusive, based on the total weight of the silicone sealant composition, of an oximosilicon compound which is an oximosilane or a mixture of oximosilanes and which has a general formula $R_xSi(Ox)_y(OR')_z$ in which R is methyl, ethyl, vinyl, or phenyl, R' is methyl or ethyl, Ox is ethylmethylketoximo, x has an average value of form 0 to 2 inclusive, y has an average value of from 2 to 4, z has an average value of from 0 to 2 inclusive, the sum of x, y, and z is 4, and the mixture of oximosilanes have at least 80% of the silane molecules with 2 or more ethylmethylketoxio groups per molecule.

2. The sealant composition according to claim 1 in which the oximosilicon compound used is a mixture of oximosilanes where x is 1, R is methyl, R' is methyl, and y is less than 3, and z is greater than 0.1.

3. The sealant composition according to claim 1 in which the oximosilicon compound is tetra(ethylmethylketoximo)silane.

4. The sealant composition according to claim 2 in which the polydiorganosiloxane of the room temperature vulcanizable silicone sealant composition is polydimethylsiloxane and the titanium catalyst of the room temperature vulcanizable silicone sealant composition is tetrabutyltitanate.

5. The sealant composition according to claim 3 in which the polydiorganosiloxane of the room temperature vulcanizable silicone sealant composition is polydimethylsiloxane and the titanium catalyst of the room temperature vulcanizable silicone sealant composition is tetrabutyltitanate.

* * * * *